No. 724,030. PATENTED MAR. 31, 1903.
E. A. MOORE.
GAS AND TAR SEPARATOR.
APPLICATION FILED JUNE 5, 1902.
NO MODEL. 4 SHEETS—SHEET 1.
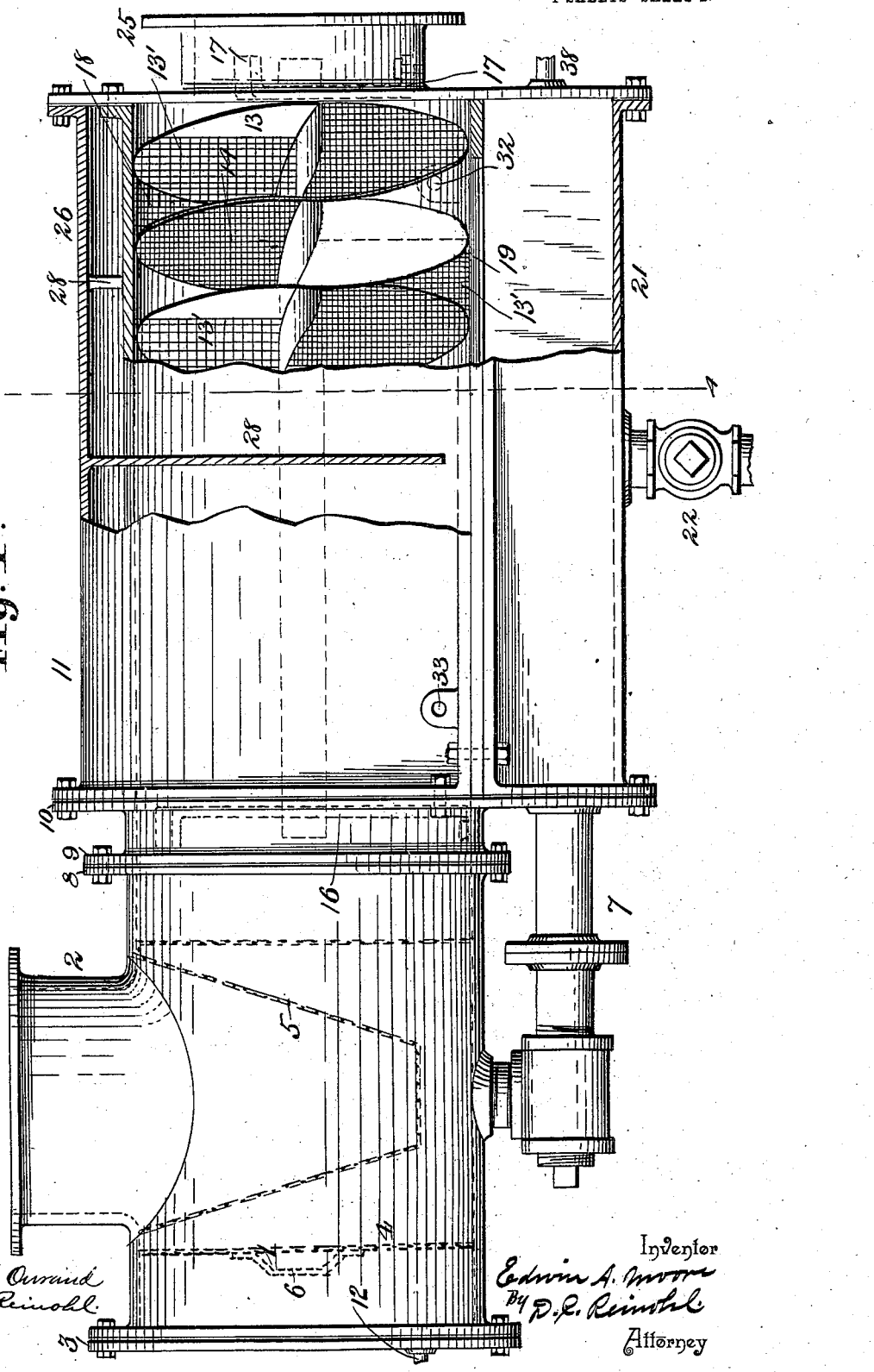

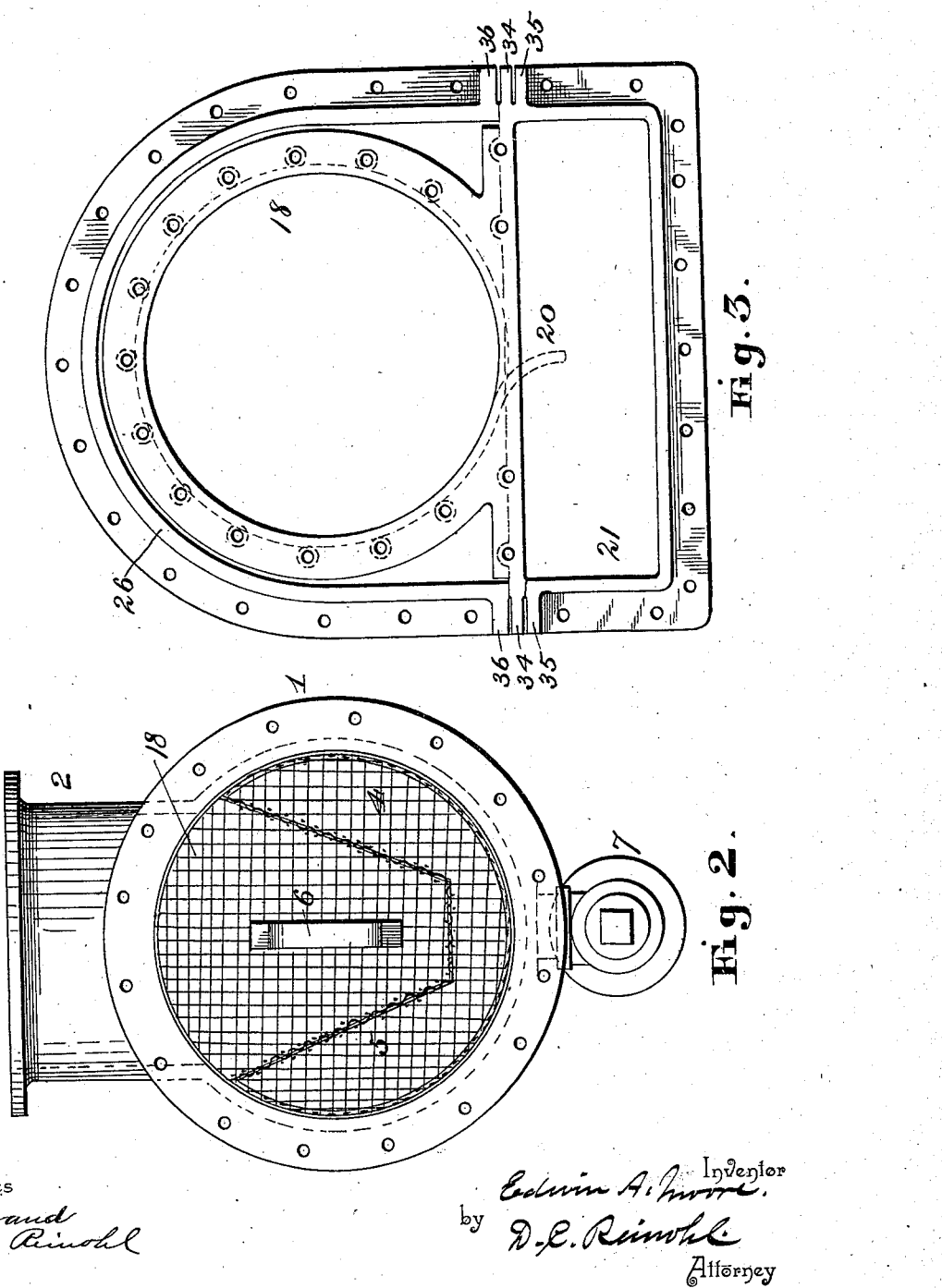

No. 724,030. PATENTED MAR. 31, 1903.
E. A. MOORE.
GAS AND TAR SEPARATOR.
APPLICATION FILED JUNE 5, 1902.
NO MODEL. 4 SHEETS—SHEET 3.
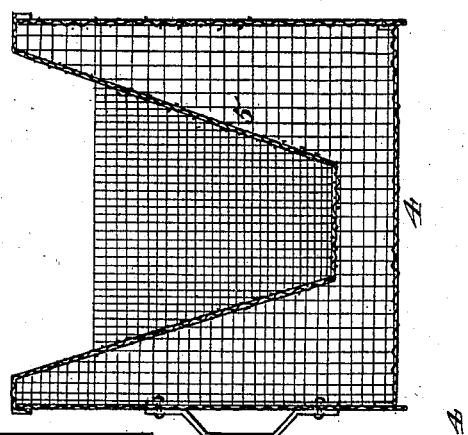
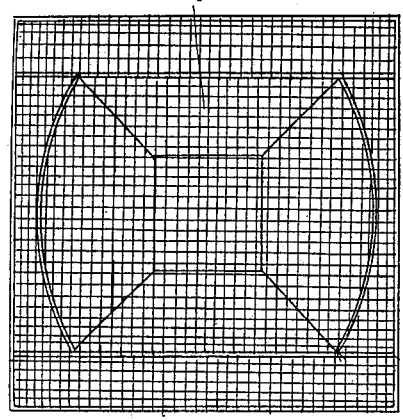
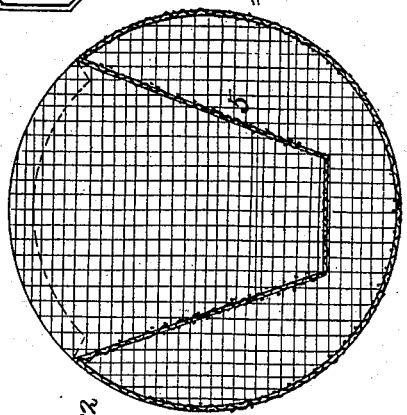
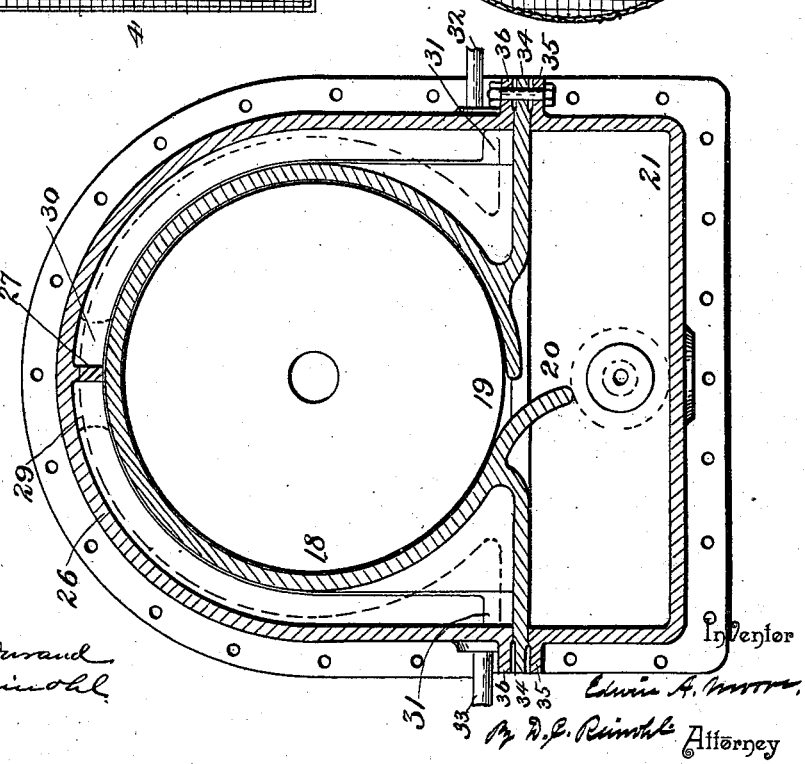

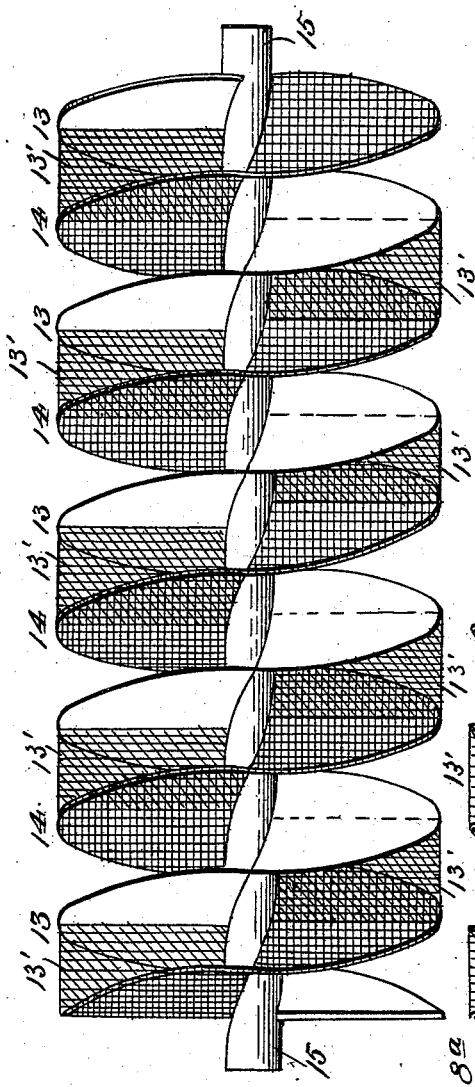
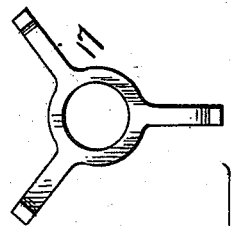
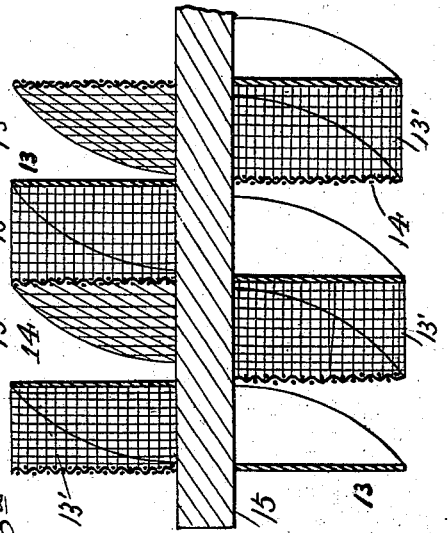

UNITED STATES PATENT OFFICE.

EDWIN A. MOORE, OF PHILADELPHIA, PENNSYLVANIA.

GAS AND TAR SEPARATOR.

SPECIFICATION forming part of Letters Patent No. 724,030, dated March 31, 1903.

Application filed June 5, 1902. Serial No. 110,376. (No model.)

*To all whom it may concern:*

Be it known that I, EDWIN A. MOORE, a citizen of the United States, residing at Philadelphia, in the county of Philadelphia and State of Pennsylvania, have invented certain new and useful Improvements in Gas and Tar Separators; and I do hereby declare the following to be a full, clear, and exact description of the invention, such as will enable others skilled in the art to which it appertains to make and use the same.

My invention relates, primarily, to gas-works, has especial reference to gas and tar separators used in connection with gas-condensers, has for its object the thorough separation of the tar from the gas, and consists in certain improvements in construction which will be fully disclosed in the following specification and claims.

In the accompanying drawings, which form part of this specification, Figure 1 represents a vertical longitudinal section, partly in side elevation, of my invention; Fig. 2, an end view of the primary separator; Fig. 3, a like view of the secondary separator; Fig. 4, a vertical transverse section on line 4 4, Fig. 1; Fig. 5, a top plan view of the wire basket for the primary separator detached; Fig. 6, a side elevation of the same; Fig. 7, an end view of the same; Fig. 8, a side elevation, on an enlarged scale, of the spiral breaker in the secondary separator detached; Fig. 8ª, a vertical longitudinal section of the same, and Fig. 9 a side and end view of the spiders for supporting the breaker.

Reference being had to the drawings and the numerals thereon, 1 indicates the primary separator, preferably cylindrical in form, provided with an inlet branch 2 for connection with a gas-pipe, a head 3 on the outer end of the primary separator, a reticulated tar-arresting basket 4, cylindrical in cross-section to fit the inside of the separator 1 and removable therefrom for cleaning and renewal, and is provided with a tapering or funnel-shaped breaker 5, the whole being made of galvanized wire, and the basket is also provided with a handle 6 on one end. A pipe 7 to conduct gas from the primary separator to the tar chamber or receptacle 21 of the secondary separator is connected by a flange 8 to the neck 9 on the inner head 10 of the secondary separator 11, as shown in Fig. 1.

The head 3 is provided with a steam-inlet 12 for cleaning the interior of the primary separators of any deposits which may accumulate on the walls thereof.

The secondary separator 11 is provided with a baffle-plate or breaker consisting of a helically-wound plate 13 and a like-wound reticulated breaker 14, of galvanized wire, the plate serving to arrest and deflect the gas and the tar and the wire to break the column of gas and arrest or collect the tar contained therein, or supplemental breakers or arresters 13' may be placed between the parts 13 and 14 to further arrest the gas and collect the tar. The parts 13 and 14 are secured to a shaft 15, which is supported on spiders 16 and 17.

The separator 11 is cylindrical in cross-section, and its chamber 18 is provided with an elongated discharge 19 and an extended flange or lip 20, over which the tar passes from the walls of the chamber 18 in its descent to the tar receptacle or chamber 21, as shown in Fig. 4, and the tar is discharged from the chamber 21 through cock 22.

The separator 11 is provided with a head 23, having a neck 24, in which one of the shaft-supporting spiders is secured, and to the flange 25 of the neck connection is made with a suitable pipe for conducting the gas to a condenser or other apparatus. (Not shown.)

26 is a cover forming a water-jacket around the chamber 18 and is separated longitudinally by rib 27 and transversely by ribs 28, having suitable openings 29, 30, and 31 for the circulation of the water in the jacket, admitted through openings 32 in the sides of the jacket, near the discharge end thereof, and discharged through openings 33.

The separator 11 is also provided with flanges 34, by which the tar-receptacle is secured thereto by flanges 35 thereon, and the cover 26 is also secured to the separator 11 by flanges 36 thereon and bolts 37, as shown in Figs. 1, 3, and 4, and the chamber 21 is provided with a pipe 38 to admit steam thereto for melting or dissolving the tar or other matter which may adhere to the walls of said chamber.

Having thus fully described my invention, what I claim is—

1. A gas and tar separator provided with a reticulated basket the diameter of the interior of the separator and having an inner suspended reticulated member, and a tar-discharge in the bottom of the separator.

2. A gas and tar separator provided with a recticulated basket having an inner tapering recticulated member.

3. A gas and tar separator provided with a fixed helical reticulated gas-current breaker and tar-arrester, and a tar-receptacle thereunder.

4. A gas and tar separator provided with a fixed helical reticulated gas-current breaker and tar-arrester, and a fixed helical baffle-plate intermediate the coils of the reticulated member, and a tar-receptacle thereunder.

5. A gas and tar separator provided with alternate reticulated tar-arresters and interposed solid baffle-plates, and transversely-interposed reticulated tar-arresters.

6. A gas and tar separator having an elongated discharge, a fixed concentric helical reticulated gas-current breaker and tar-arrester, and a tar-receptacle under and the length of the separator.

7. A gas and tar separator having an elongated discharge provided with an extended lip or flange, a helical reticulated gas-current breaker and tar-arrester provided with a baffle-plate, and a tar-receptacle under the separator and into which the lip extends.

8. A gas and tar separator provided with a fixed reticulated gas-current breaker and tar-arrester, and a water-jacket for applying a cooling medium to the wall thereof.

9. A gas and tar separator consisting of a primary and a secondary receptacle connected at their adjacent ends, each receptacle having means for breaking the current of the gas and arresting tar, and a tar-receptacle under the secondary receptacle and in communication with both of the former receptacles.

10. A gas and tar separator consisting of a primary and a secondary receptacle connected at their adjacent ends, a reticulated gas-current breaker and tar-arrester in each receptacle, and a tar-receptacle under and the length of the secondary receptacle.

In testimony whereof I affix my signature in presence of two witnesses.

EDWIN A. MOORE.

Witnesses:
D. C. REINOHL,
C. W. METCALFE.